Dec. 26, 1933.  C. H. WEISKOPF  1,941,287
APPARATUS FOR CONTROLLING GAS FLOW
Filed Aug. 17, 1929  4 Sheets-Sheet 2

INVENTOR.
Charles H. Weiskopf
BY Arthur P. Knight
and Alfred W. Knight
ATTORNEYS Dec. 26, 1933.  C. H. WEISKOPF  1,941,287
APPARATUS FOR CONTROLLING GAS FLOW
Filed Aug. 17, 1929   4 Sheets-Sheet 3

INVENTOR
Charles H. Weiskopf
BY Arthur P. Knight and
Alfred W. Knight
ATTORNEYS

Dec. 26, 1933.  C. H. WEISKOPF  1,941,287

APPARATUS FOR CONTROLLING GAS FLOW

Filed Aug. 17, 1929   4 Sheets-Sheet 4

INVENTOR.
Charles H. Weiskopf
BY Arthur P. Knight
and Alfred W. Knight
ATTORNEYS Patented Dec. 26, 1933

1,941,287

UNITED STATES PATENT OFFICE 1,941,287

APPARATUS FOR CONTROLLING GAS FLOW

Charles H. Weiskopf, Hawthorne, Calif., assignor to International Precipitation Company, Los Angeles, Calif., a corporation of California Application August 17, 1929. Serial No. 386,723

7 Claims. (Cl. 137—75)

This invention relates to means for controlling the flow of gas and particularly for equalizing or controlling the distribution of gas flow in a plurality of gas passage means to which the gas is supplied from a common source and through which the gas flows in parallel. The invention is particularly adapted for use in controlling the distribution of gas flow through a plurality of electrical precipitator units connected for parallel gas flow, but may also be used in other cases where control or distribution of flow of gas in one or more flue chambers or other passages is required.

The principal object of the invention is to provide a gas controlling or distributing device which is simple in operation and requires a relatively small amount of power to operate the same, which is adapted to provide any desired degree of restriction to gas flow, and which creates a minimum disturbance in the normal stream line flow of the gas.

The apparatus comprises essentially two sets of elongated members, the members of each set being spaced apart and parallel to one another in a common vertical plane, constituting what may be termed a "curtain", and the two curtains or sets of elongated members being disposed in parallel planes spaced somewhat apart, with the members of the two sets staggered with respect to one another, and means for moving the two curtains or sets of elongated members relatively toward or away from one another so as to vary the resistance to gas flow therethrough, while keeping the planes of the curtains parallel to one another at all positions of adjustment, so as to maintain substantially equal resistance to gas flow over the entire area of the curtains. The distance between the elongated members of each curtain may be substantially equal to, or somewhat greater or less than, the distance between the two curtains. The relative movement of the two curtains is such that relative movement of the respective elongated members occurs in planes perpendicular to the planes of the curtains and parallel to said elongated members, thus maintaining the staggered relationship of the members of the respective curtains. Both the curtains may be moved, or if desired only one of the curtains may be moved toward or away from the other curtain. With such a construction, when the curtains are relatively far apart, a practically free flow of gas between the elongated members of each curtain is permitted, but as the curtains are moved closer and closer together the elongated members of each curtain are brought more and more closely into register with the spaces in the other curtain so as to increasingly restrict the flow of gas through such spaces.

The elongated members are preferably disposed vertically, and an advantageous means of moving the same relatively toward or from one another comprises lever means connected to the two curtains and mounted for rotation about a horizontal axis intermediate the planes of the two curtains and means for swinging said lever means about said axis. When said lever means are disposed horizontally, the two curtains are at a maximum distance apart, and upon movement of said lever means in either direction toward a vertical position the two curtains will be moved relatively toward one another, one of said curtains being at the same time raised and the other one lowered. Such relative vertical movement of the curtains, however, will not disturb the staggered relationship of the elongated members in the respective curtains, due to the vertical disposition of said members. A particular advantage of this arrangement is that the weight of one curtain is substantially counterbalanced by the weight of the other, and a minimum amount of power is therefore required for operation thereof.

The accompanying drawings illustrate a preferred embodiment of my invention and certain modifications thereof, and referring thereto:

Figure 1:
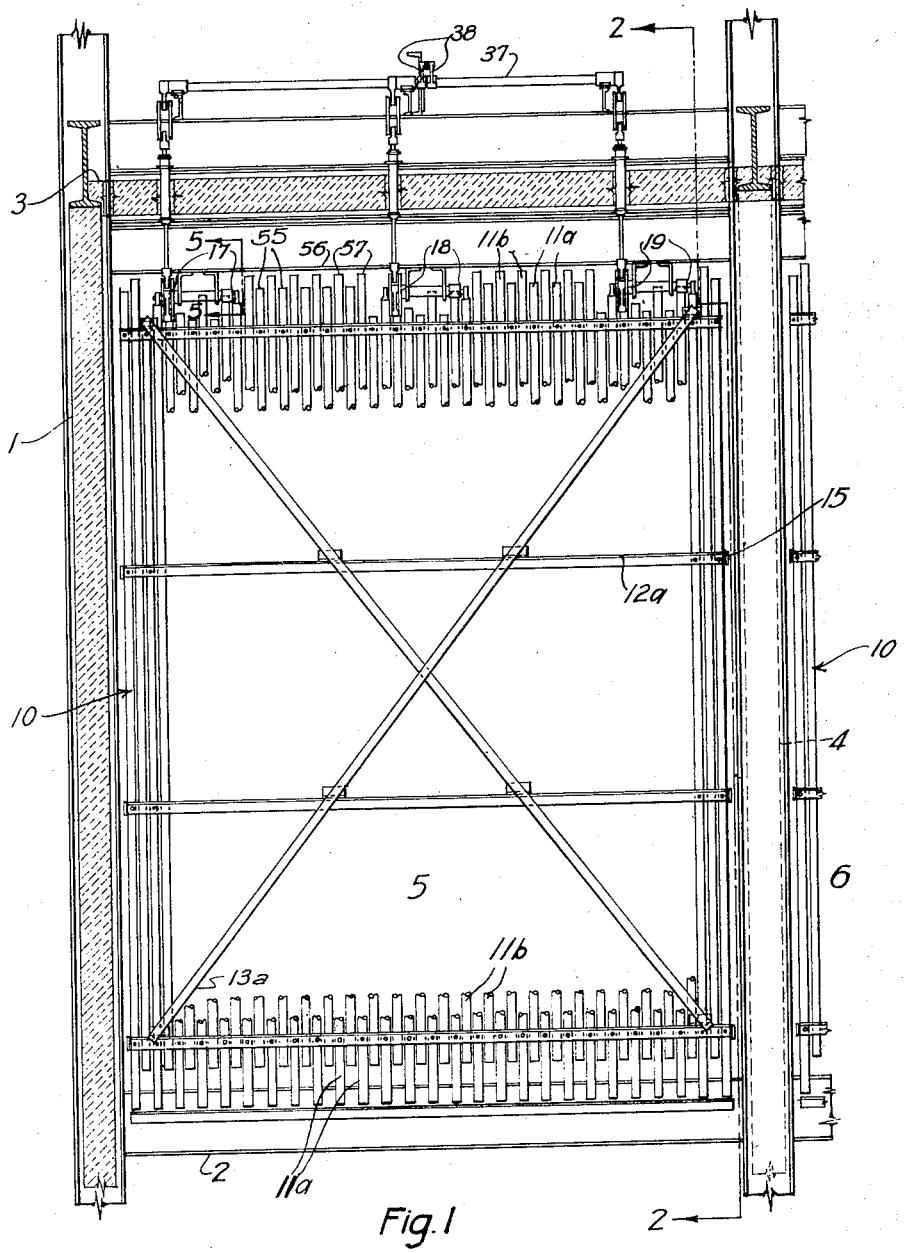
Fig. 1 is a front elevation of the controlling apparatus mounted at the inlet of a flue, showing also a portion of a similar apparatus at the inlet of an adjacent parallel flue.
Figure 2:
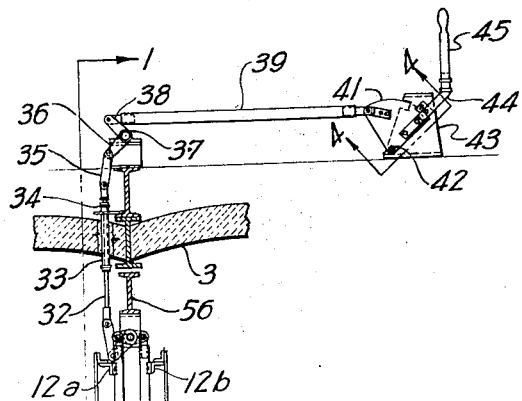
Fig. 2 is a vertical section on line 2—2 in Fig. 1.
Figure 4:
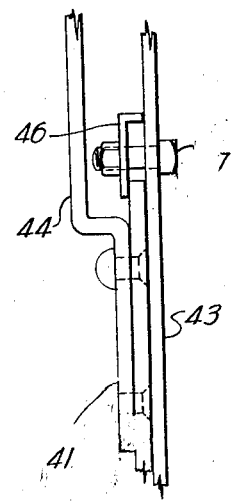
Fig. 4 is a section on line 4—4 in Fig. 2, showing part of the operating mechanism and clamping or holding means for the apparatus.
Figure 3:
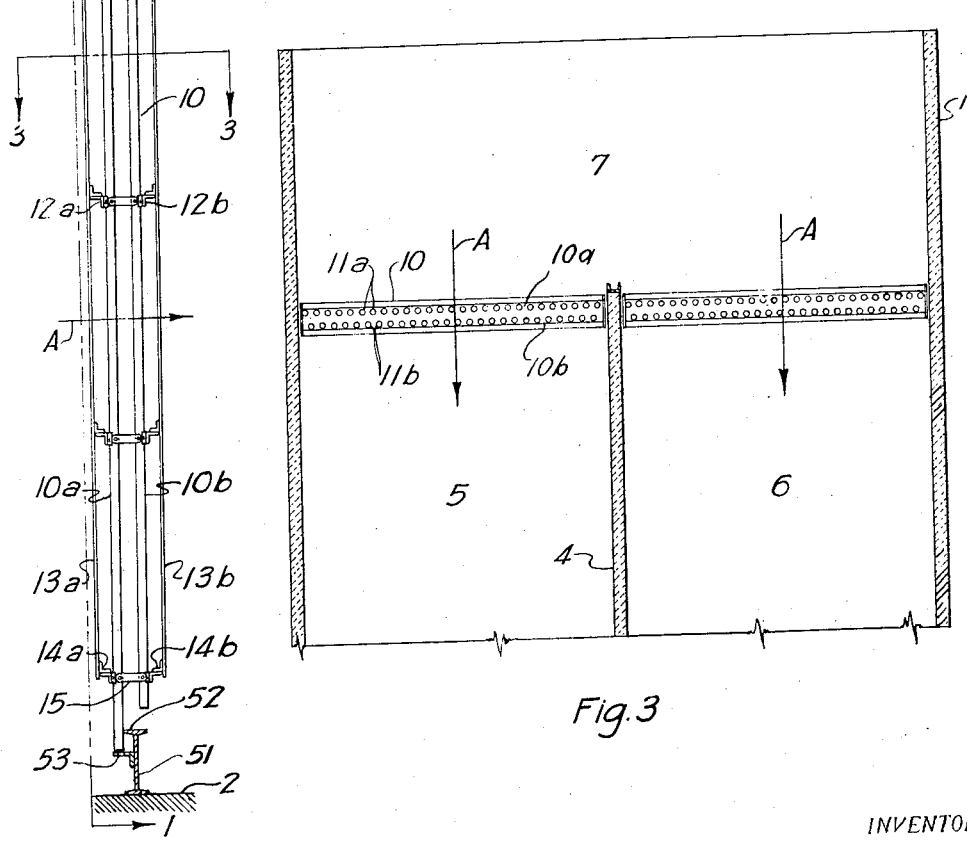
Fig. 3 is a horizontal section on line 3—3 in Fig. 2.

In Figs. 1, 2 and 3, side walls 1, bottom wall 2, and top wall 3 are shown as defining a gas passage or flue. An intermediate wall 4 serves to divide a portion thereof into two parallel flues 5 and 6, while the portion 7 in advance of said intermediate wall constitutes a common flue or header from which gas is supplied to the parallel flues 5 and 6. The flues 5 and 6 may be considered as leading to, or forming a part of, parallel electrical precipitator units, or they may be for any other purpose. The direction of gas flow is as indicated by the arrows A in Figs. 2 and 3. A gas controlling or distributing device 10 according to this invention extends across between the intermediate wall 4 and each of the side walls 1 adjacent the entrance from the common flue or header 7 into the respective flues 5 and 6. It will be understood that, in general, where it is desired to control distribution of gas flow in two or more parallel flues or passages, such distributing means may be provided in any one or more of said passages as may be required to effect the desired regulation. Each of said controlling or distributing means comprises a curtain 10a consisting of a plurality of vertical elongated members, such as tubes or pipes 11a, spaced from one another and hanging vertically in a common vertical plane, and a curtain 10b also consisting of a plurality of elongated members 11b spaced from one another and hanging vertically in a common vertical plane, the said curtains being parallel to one another and the curtain 10b being normally disposed somewhat beyond the curtain 10a in the direction of gas flow. The elongated members of the respective curtains may be connected together at intervals throughout their height by transverse bars 12a and 12b respectively, and may be further connected together and braced by means of diagonal bars or strips 13a and 13b respectively, said diagonal bars being connected to the transverse bars by means of brackets 14a and 14b. The ends of the two curtains are also preferably linked together at intervals throughout their height as by means of link members 15 pivotally connected to the elongated members or to the transverse bars 12a and 12b in any suitable manner.

Figures 5, 6:
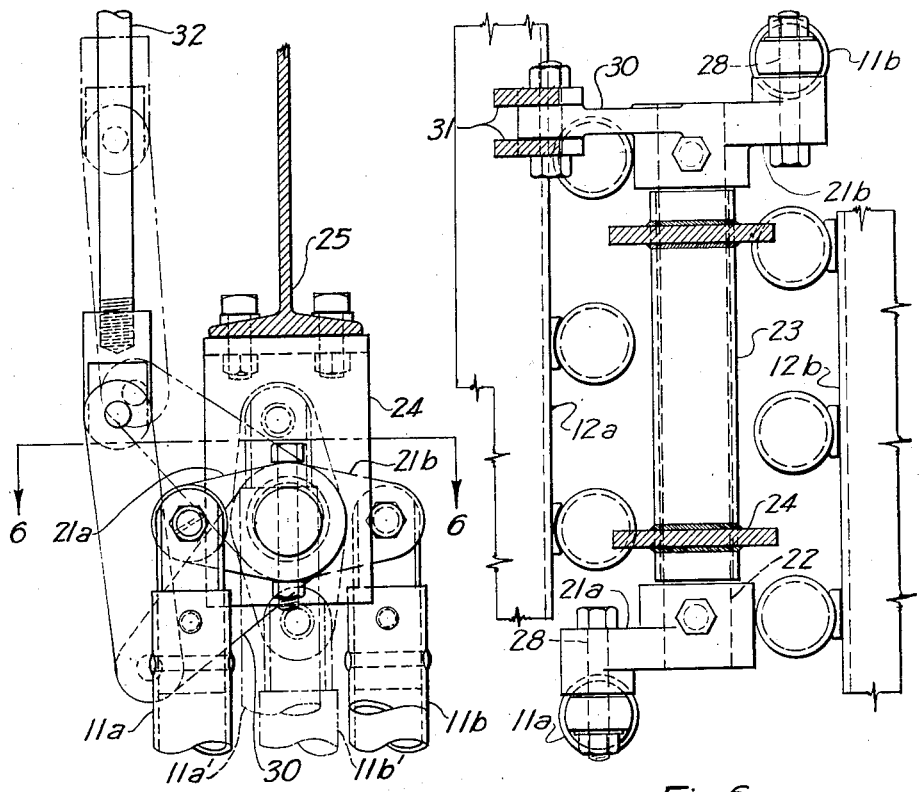
Fig. 5 is an enlarged section on line 5—5 in Fig. 1.
Fig. 6 is a horizontal section on line 6—6 in Fig. 5.
Figure 7:
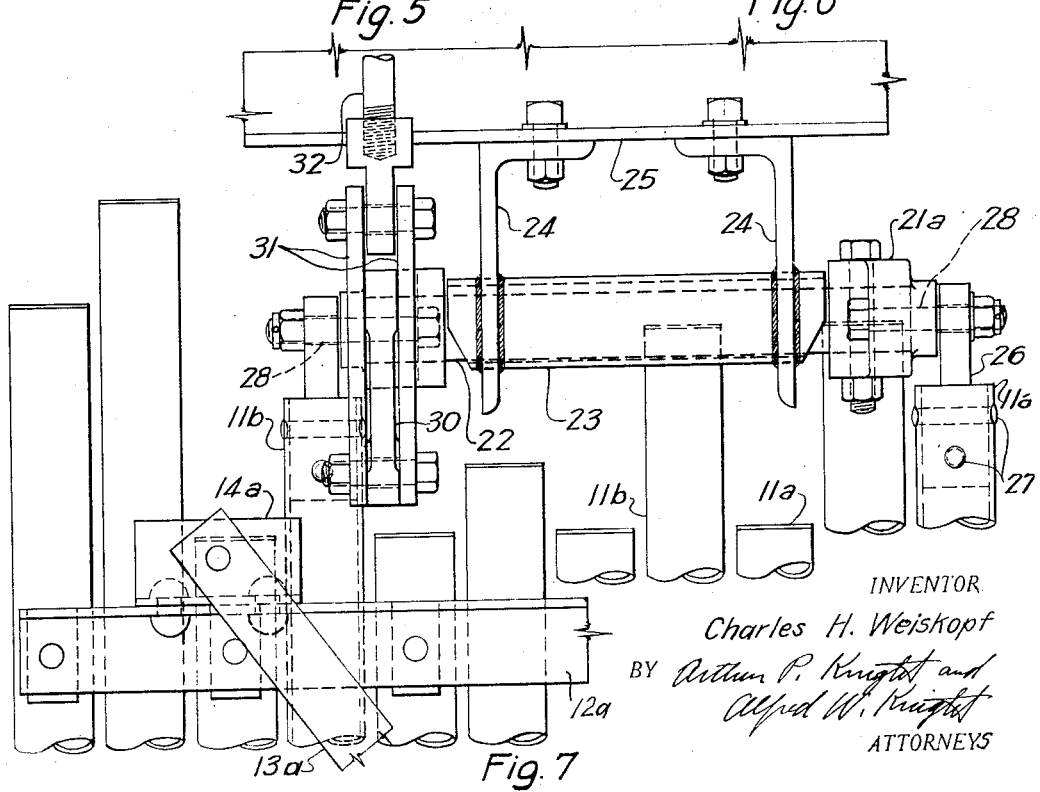
Fig. 7 is an elevation of the parts shown in the last two figures, taken from the left side of Fig. 5.

The means for effecting relative movement of the curtains toward or away from one another may comprise one or more lever means such as shown at 17, 18 and 19 in Fig. 1, each comprising, as shown more particularly in Figs. 5, 6, and 7, a lever arm 21a pivotaly connected to the upper end of one of the elongated members 11a of curtain 10a and a lever arm 21b pivotally connected to the upper end of one of the elongated members 11b of the other curtain. Said two lever arms are secured to a common shaft 22 rotatably supported in a bearing sleeve 23 supported by brackets 24 from a suitable supporting beam 25. For the sake of convenience, the lever arms 21a and 21b are shown as mounted at opposite ends of said shaft. The connection of each lever arm to the elongated member of the corresponding curtain may be made by means of a connecting member 26 whose lower portion is connected to the upper end of the elongated member as by pins or rivets 27 and whose upper end is pivotally connected to the lever arm by a pin or bolt 28.

Shaft 22 is also provided with an operating arm 30 which may as shown be formed integrally with one of the lever arms, such as 21b. The outer end of arm 30 is connected by link members or straps 31 to a rod 32 which is slidably mounted in a sleeve 33 extending through the top wall 3 and provided with packing means 34. The upper end of rod 32 is in turn connected through link means 35 and lever arm 36 to a common operating shaft 37, which extends across above all of the lever means 17, 18 and 19 and is operatively connected thereto in similar manner. Shaft 37 is in turn connected by lever arms 38 to a rod 39 whose other end is pivotally connected to a segment 41 pivotally mounted at 42 on a supporting member 43. A lever arm 44 connected to said segment has its upper portion formed as a handle 45 for permitting manual operation thereof. The segment 41 may be held in any desired position by means of a clamping member 46 provided with a bolt 47 by means of which said clamping member may be drawn inwardly to clamp the upper edge of said segment between said clamping member and the supporting member 43.

The lower ends of the two curtains may be maintained in proper alignment transversely of the passage by means of an I-beam 51 supported in fixed position in any suitable manner. The lower ends of the elongated members of curtain 10a rest against the forward edge of the upper flange 52 of said I-beam. A fixed abutment member, such as angle bar 53 may also be secured to the front side of said I-beam in such position that said elongated members of curtain 10a rest or strike against the same when in their lowermost position, which in the present instance corresponds to full opening of the control apparatus. The elongated members of curtain 10a terminate at their upper ends, as shown at 55, somewhat below the top of the opening in which the device is mounted, so as to avoid said members striking the I-beam 56 at the top of the opening when this curtain is raised as hereinafter described. The elongated members of the other curtain 10b, however, may extend upwardly somewhat higher than those of the first named curtain as shown for example at 57, for there is no upward movement of curtain 10b, but rather only a downward movement thereof, from the position shown in the drawings, when the device is operated from open toward closed position. It will also be noted that certain of the elongated members directly beneath the several lever means 17, 18 and 19 are of somewhat less height than the remainder of said elongated members in order to avoid striking any parts of said lever means and the operating mechanism associated therewith, during operation of the device.

It will be seen that with the two curtains in the relative positions shown in Figs. 2 and 3 and in full lines in Fig. 5, that is, with both lever arms of the lever means in horizontal position, the two curtains are a maximum distance apart and a minimum restriction or opposition is, therefore, offered to flow of gas therethrough. If it is desired to increase the resistance to gas flow, the lever 44 is moved in a clockwise direction in Fig. 2 by means of handle 45, thus moving lever arms 21a and 21b also in a clockwise direction and bringing the two curtains relatively toward one another while raising curtain 10a and lowering curtain 10b. The other extreme position of the elongated members of the two curtains, that is, the position of maximum resistance to gas flow, is illustrated in dotted lines at 11a' and 11b' in Fig. 5. When in these positions, the members 11a' lie almost directly in the spaces between the members 11b' of the other curtain, thus leaving only a relatively small area of openings for passage of the gas. By adjusting the two curtains to different positions between these two extremes, any desired adjustment or control may be obtained, and said curtains may be held in the desired positions by engagement of the clamping means 46 and 47 above described with segment 41. Since the curtains are supported at their upper ends by the lever means 17, 18 and 19, it is evident that the force of gravity causes the same to hang in substantially parallel vertical planes in all positions of adjustment thereof, and link means 15 also serve to positively maintain such parallel relation.

A particular feature of the construction is that in case dust or other suspended matter carried by the gases should be deposited upon the elongated members or other parts of the curtains, such deposited material may be readily removed therefrom by moving lever 44 so as to cause the lower ends of members 10a to forcibly and repeatedly strike against the fixed bar 53, thus jarring the entire assembly and serving to loosen such material which then falls by gravity to the bottom of the passage.

Figure 8:
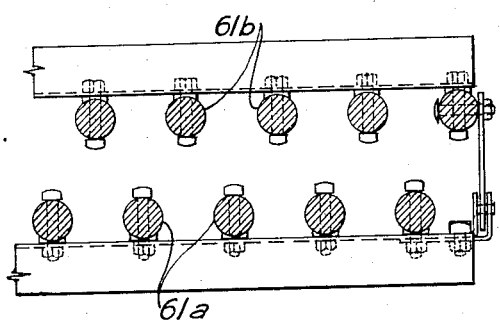
Figs. 8 and 9 are partial horizontal sections showing modified forms of elongated members.
Figure 9:
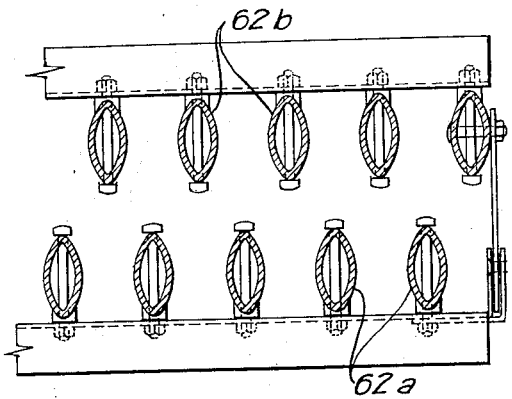

Many modifications may be made in the above described apparatus without departing from the spirit of the invention. For example, the vertical elongated members of which the respective curtains are formed may consist of solid rods or bars 61a and 61b as shown in Fig. 8, the rounded construction of these bars whether solid or tubular serving to facilitate the passage of gas or fluid therebetween and reduce loss of pressure due to friction or turbulence. With a view to still further reducing such losses said members may be formed of hollow tubular members 62a and 62b of oval or elongated cross section, the elongation of the cross section thereof being in the direction of gas flow and perpendicular to the planes of the respective curtains, so as to facilitate stream line flow of the gas between said members and still further reduce the disturbance in smooth flow of the gas.

Figure 10:
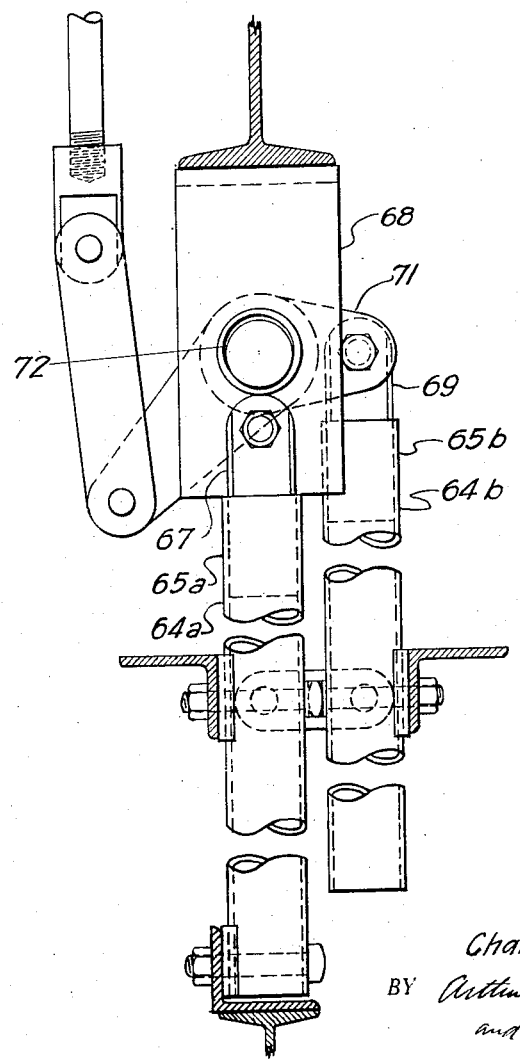
Fig. 10 is a view similar to Fig. 5, showing a construction in which only one of the curtains is movable.

Also, as shown in Fig. 10, one of the curtains, such as 64a may be fixed, while the other curtain 64b is movable toward or away from said first named curtain. In this case, certain of the elongated members 65a of the fixed curtain may be connected by members 67 to fixed supporting brackets 68, while the elongated members 65b may be supported by members 69 from lever arm 71 secured to a shaft 72 rotatably mounted on said brackets 68 and provided with suitable operating member in the same manner as the shaft 22 in the form of the invention first described. In this form of the invention, rotation of shaft 72 in a clockwise direction will cause curtain 64b to move downwardly and toward the fixed curtain so as to vary the resistance to gas flow in a manner similar to that above described.

I claim:

1. An apparatus for controlling gas flow comprising two curtains disposed in parallel vertical planes and each comprising a plurality of parallel elongated members rounded in cross-section and spaced somewhat apart, the elongated members of the respective curtains being staggered with respect to one another, and means for moving said curtains relatively toward or away from one another while keeping the planes thereof substantially parallel to one another in all positions of adjustment so as to vary the resistance to passage of gas therethrough while keeping such resistance substantially uniform over the entire area of the curtains.

2. In combination with means defining a gas passage, an apparatus for controlling flow of gas therethrough comprising two parallel vertical curtains extending substantially across the area of said gas passage and each comprising a plurality of elongated members spaced from one another, each of said curtain members being rounded in cross-section but elongated in a direction perpendicular to the plane of the curtain, the elongated members of each curtain being disposed opposite the spaces between the elongated members of the other curtain and being of sufficient width to appreciably obstruct said spaces when the two curtains are brought close together, and means for moving said curtains relatively toward or away from one another while keeping the planes of the respective curtains substantially parallel to one another, so as to vary the resistance to flow of gas in said passage while keeping such resistance substantially uniform over the entire area of said passage.

3. An apparatus for controlling gas flow comprising two parallel vertical curtains, each comprising a plurality of parallel elongated members spaced from one another, the elongated members of each curtain being disposed opposite the spaces between the elongated members of the other curtain, and means operable to move said curtains relatively toward and away from one another in such manner that the relative movement of the respective elongated members occurs in planes parallel to said elongated members and perpendicular to the planes of the curtains, and to cause said curtains to remain substantially vertical and parallel to one another in all positions of adjustment.

4. An apparatus for controlling gas flow comprising two parallel vertical curtains each comprising a plurality of vertically extending elongated members spaced from one another, and means for moving said curtains relatively toward and away from one another while keeping the same substantially vertical and parallel to one another, the elongated members of each curtain being disposed opposite the spaces between the elongated members of the other curtain and the relative movement of the elongated members being in vertical planes perpendicular to the planes of the curtains.

5. An apparatus for controlling gas flow comprising two parallel vertical curtains, each comprising a plurality of vertical elongated members spaced from one another, the elongated members of each curtain being disposed opposite the spaces between the elongated members of the other curtain, lever means pivotally mounted about a horizontal axis intermediate the planes of the two curtains, and connected to the upper portions of the two curtains, and means for rotatably moving said lever means about said axis.

6. An apparatus as set forth in claim 5, and comprising in addition, fixed abutment means in position to be forcibly struck by the elongated members of one of said curtains upon movement thereof to one extremity of the movement thereof by said lever means.

7. An apparatus as set forth in claim 5 and comprising in addition, link means connecting said curtains together at positions materially below the position of said lever means, so as to assist the action of gravity in maintaining said curtains in parallel vertical planes at all positions of adjustment thereof.

CHARLES H. WEISKOPF.